May 22, 1951     S. MORREALE     2,554,375
AUTOMOBILE PUSH BAR
Filed May 1, 1947
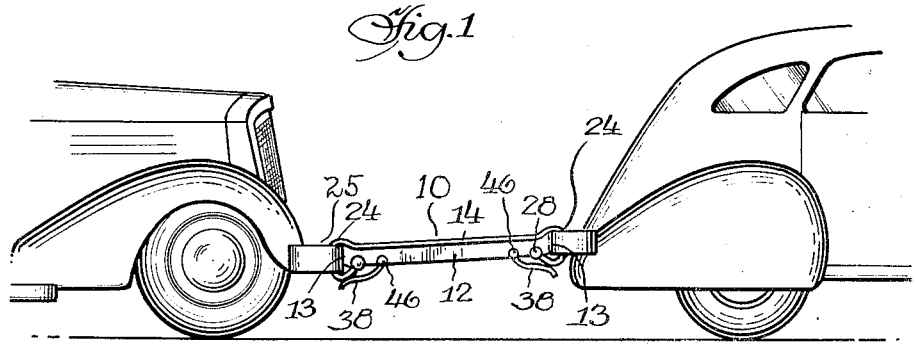
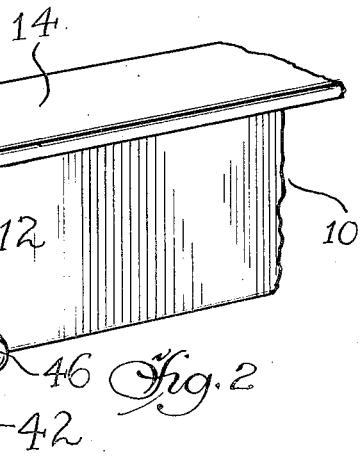
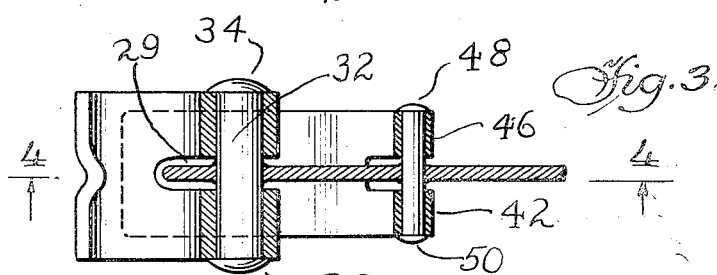
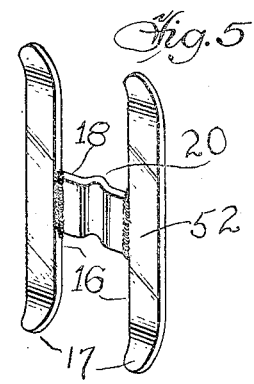
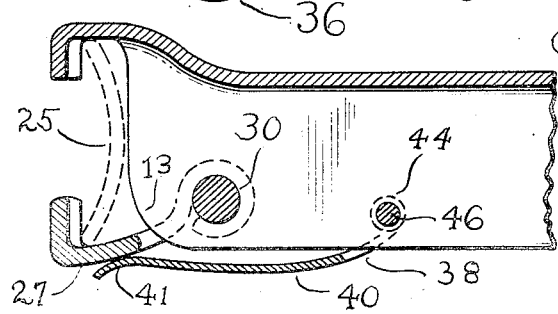
INVENTOR.
Sam Morreale
BY T. B. Slisz
Atty.

Patented May 22, 1951

2,554,375

UNITED STATES PATENT OFFICE 2,554,375

AUTOMOBILE PUSH BAR

Sam Morreale, Chicago, Ill.

Application May 1, 1947, Serial No. 745,331

6 Claims. (Cl. 280—33.13)

This invention is directed to an automobile push bar. More specifically it is directed to a push bar in combination with the front bumper of an automobile, which can be readily attached and disengaged whenever it is needed.

Automobiles when in trouble, require some sort of towing service. Most frequently it is engine or motor trouble that necessitates such service though other mechanical difficulties particularly those involving wheels and appurtenant devices may at times need such services. Therefore, in majority cases though the automobile lacks automotive power because of engine or motor failure it nevertheless can proceed along the road to the garage for repairs if it is propelled or pulled by some other vehicle.

Again and particularly in cold weather, when the oil in the crankcase is heavy and the gasoline mixture does not readily vaporize or when the charge in the electrical system is low, then it is highly desirable to give the incapacitated automobile a shove or push so that the engine can be turned over by the power transmitted from the rear wheels of the vehicle, when the wheels are in frictional engagement with the pavement. Such action not only loosens the oil but also primes the engine and in addition allows the generator to produce sufficient electrical energy to explode the gas-air mixture in the primed cylinders.

In starting an automobile that is incapacitated with engine trouble, it is desirable to push the automobile. The automobile is in traction with the pavement and as soon as the engine "catches" or starts, then the automobile is able to move away from the pusher vehicle. On the other hand, when a car is being pulled or towed then when the engine starts, there frequently is some difficulty in knowing when the engine is started with the result that the engine is "killed." In addition, the towed car when started sometimes spurts forward and hits the towing vehicle.

In pushing a car and in the absence of my improved invention, the pusher car applies pressure to the disabled vehicle through their front and rear bumpers respectively. In spite of all care and precaution, the bumpers of either car may become locked with the other and they may be damaged or even torn off completely. Again and particularly if the pavement level is uneven as at curbs and alleyways, upon attempted contact the bumpers may overlap themselves with the result that either the grill work or fenders of the pusher car are destroyed and damaged or the rear trunk of the pushed car is stowed in by the impact. This has happened so many times that even good Samaritans who ordinarily would be willing to help a disabled car with a push reluctantly deny such requests for help for the fear of damaging their car.

It therefore is an object of my invention to provide a means whereby a car can be easily and conveniently pushed without danger to occupants of either vehicles.

A further object of my invention is to provide a means to push an automobile safely, surely and without damage to the grill work and body of either car.

A still further object of my invention is to provide a means for pushing a stalled automobile and which can be readily attached and disengaged from the bumpers of the vehicles.

A still further and additional object of my improved push bar is to provide a means thereon that it is fool proof and will remain ready to push the disabled car regardless of the level at which the rear bumper of the pushed car lies in reference to the pushing rod.

These and other objects, adaptations, variations and modifications will be readily discernable to one skilled in this art particularly in view of the illustration of the preferred embodiment shown in the attached drawing forming a part hereof and in which—

Figure 1 is a view showing the bar in use.

Figure 2 is enlarged view in perspective showing the clamping arrangement.

Figure 3 shows in section the lower plan portion of the attaching end, while

Figure 4 is an elevational view of Figure 3 taken along line 4—4 to show how the clamp engages to the bumper, a portion of which is shown as a phantom sketch.

Figure 5 shows in perspective a pusher insert that fits within the clamping device.

For convenience the numerals in the specifications refer to like characters in the drawings to identify the elements thereof, but in no case shall the preferred embodiment be considered as a limitation of the fundamental concepts underlying my invention except as defined in the claims given hereinbelow.

The bar 10 consists of a channel substantially T-like in cross sectional shape consisting of a web 12 and flange 14. At each end thereof is a clamping means 22 which can be readily attached or disengaged to the bumper of either car. The clamping means 22 consists of an upper attaching hooklike bar 24 and a lower hinged lock means 26.

The lower clamping jaw 26 straddles the web 12 of the channel 10 to terminate into a bifurcated bearing member 28. An aperture 30 is placed near the lower portion of the end 13 in the web 12 of the channel 10 to provide a bearing receiving surface in said web 12 for shaft 32. The shaft 32 fits snugly through the bifurcated bearing member 28, the aperture or hole 30 in the web 12 and is fastened firmly into position by hammering the ends thereof to form mushroom caps 34 and 36 respectively. This assembly is thus locked in a movable juxtaposition with reference to the web 12 and the fixed clamp jaw 24.

In order to allow the lower clamping device 26 to move freely in performing its function, the outer lowermost corner of the end 13 is arcuate in contour so that the slot 29 of the bifurcated bearing member 28 can move embracingly and freely about the arc of the edge 13 of the web 12.

A spring like member 38 is provided to hold constantly the lower clamp device 26 in a locking position about the bumper bar 25 of the automobile. It consists substantially of a flat piece 40 which extends from underneath the lower clamping jaw 26 to a bearing point 44 beyond the bearing point 30 of the movable clamping jaw 26 on the web 12 of the channel 10. The end 41 of the flat portion 40 in contact with the bottom 27 of clamping device 26 has a slight arcuate contour to provide a slidable surface engagement with said bottom 27 and prevent undue frictional wear. The other end of the flat member 40 of the lower clamping means 26 likewise straddles the lower edge of web 12 of the bar 10 by means of a bifurcated bearing member 42. The bifurcated bearing member 42 is fitted about the aperture 44 formed in said web 12 and a shaft pin 46 is inserted through said bifurcated bearing member 42 and aperture 44. To retain the shaft 46 in position the ends thereof are pressed to form mushroomlike caps 48 and 50 respectively. Though not shown, a conventional spring to retain the arcuate edge 41 in contacting juxtaposition with the lower part of the clamping means 26 is also provided about the shaft 46, or the flat member 40 itself may be constructed of spring steel and its spring characteristics inbuilt into the bifurcated bearing member 42. It is apparent that other means may be used and still be within the scope of the fundamental concepts underlying my improved invention.

As mentioned above, it is frequently desirable under some conditions, to push an incapacitated automobile until it is able to start. To do this effectively and still not endanger pedestrians as well as others, it is desirable that as soon as the disabled car starts under its own power, it will be able to move away from the assisting car. To accomplish this end, I have provided a pusher means 52 which is a part of my invention and fits within the clamping means 22 as described hereinbelow.

The pusher means 52 consists of two or more (only two shown in drawing) vertically extending steel uprights 16 about 10 to 14 inches in height. The ends 17 of said uprights 16 are preferably slightly bent forward to prevent slippage of the bumpers of the pushed car. At substantially their midpoint there is a cross bar 18 welded to the vertical uprights 16. The distance between the uprights 16 is of such magnitude that the width of the clamping means 22 just fits snugly therebetween. Likewise, the width of the cross bar 18 is of such height that it approximates the width of the bumper 25 of the automobile and therefore it fits snugly between the jaws 24 and 26 of the clamping means 22.

To provide a still more snug fit and also to prevent lateral movement of the pusher means 52, I provide a detent 20 on the cross bar 18. The notches 20a and 20b of the clamping jaws 24 and 26 respectively fit into the recess of the detent 20 on the cross bar 18 and therefore the entire pusher means 52 is firmly held in place ready for use as a pusher. The notches 20a and 20b fitting snugly into the recess of the detent 20, prevent the shifting and moving of the pusher bar 17.

In use, I attach the bar 10 to the pusher car by placing the upper clamping means 24 over the bumper 25 of the pusher car. By allowing the bar to swing thru a downward vertical arc, the lower clamping device 26 snaps into place about the bumper bar 25. As this occurs, the spring like member 38 immediately acts and keeps the said lower clamping means 26 in a closed juxtaposition and keeps the bar 10 in place about the bumper 25. Furthermore, the weight of the bar 10 tends to keep the hook portion of the clamp 24 in position against the bumper bar 25, while the edge 13 resting against bumper bar 25 keeps the bar 10 always in an extended horizontal position to act as a rod to the disabled vehicle.

If I wish to use the bar as a push bar then I clamp the pusher means 52 within the clamping means 22 on the other end of the rod and it is ready for use. If I wish to use it as a tow bar then I utilize both clamping ends 22 and fasten them to the bumpers of the respective cars.

It is apparent that my improved invention is simple, economical to produce and readily installed as well as removed. There are no bolts or any other complicated means required for its use. Though there are many variations that one skilled in the art can readily provide, in view of my disclosure, nevertheless I consider such improvisations, variations, modifications and extensions to be within the scope of the spirit of the fundamental concepts underlying my invention as defined hereinbelow in the appended claims:

I claim:

1. In combination with two automobiles, the said automobiles having thereon bumpers, an improved pusher bar attachable to said bumpers and comprising a bar, a clamping means on each end of said bar to attach said bar to the bumpers of said automobiles, and a pusher assembly engageable by the said clamping means on the forward end of said bar, whereby a disabled automobile can be moved when said pusher assembly is placed in contact with rear bumper of said disabled automobile.

2. In the combination of claim 1, wherein the pusher means attached to said clamping means on outstanding end of said bar comprises vertically extending uprights, a crosspiece substantially at midpoint of said vertically extending uprights, the said crosspiece engaged by the said clamping means, the said uprights having sufficient length to contact bumper and to allow for variations in road level when the said pusher bar is in action, the said clamping means to attach the said bar to the bumper of an automobile on either end of said rod consists of a hook-like immovable clamping arm forming an integral part of the flange of said bar, the said bar being substantially T-like in cross section; a hinged, movable, inverted hook-like clamping arm, and a spring means urging the closure of said inverted clamping arm to the said immovable clamping arm.

3. In the combination of claim 1, wherein the pusher means attached to said clamping means on outstanding end of said bar comprises vertically extending uprights, a crosspiece substantially at mid-point of said vertically extending uprights, the said crosspiece engaged by the said clamping means, the said uprights having sufficient length to contact bumper and to allow for variations in road level when the said pusher bar is in action.

4. In the combination of claim 3, wherein the said cross bar of said pusher means is provided with a detent in cooperating juxtaposition with notches in said clamping means whereby the said pusher is maintained in a fixed vertical position within the said clamping means.

5. An improved automobile pusher rod characterized by ease of engagement and disengagement comprising a T channel, clamping means on each end of said T channel, clamping means consisting of two hook-like opposing members in substantially vertical alignment, the upper hook-like member being an integral extension of the flange portion of said T channel, the lower hook-like member consisting of a spring urged pivoted inverted jaw claw, the said inverted jaw and said spring urging means pivoted upon bifurcated bearing members and said bearing members mounted on the web of said T channel.

6. In combination with the device of claim 5, a pusher plate comprising vertically extending upright members of sufficient height to allow for normal pavement level variations between the pushing vehicle and the pushed vehicle; a cross bar substantially at midpoint of said upright members, and an opening between said uprights of sufficient width to insert the clamping means therebetween and engage said cross bar.

SAM MORREALE.

REFERENCES CITED

The following references are of record in the file of this patent:

UNITED STATES PATENTS

| Number | Name | Date |
|---|---|---|
| 1,668,718 | Holdsworth | May 1, 1928 |
| 2,150,999 | Wight | Mar. 21, 1939 |
| 2,268,181 | Bolton | Dec. 30, 1941 |